US011285552B2

(12) United States Patent
Stephenson et al.

(10) Patent No.: US 11,285,552 B2
(45) Date of Patent: Mar. 29, 2022

(54) METHODS OF SHAPING SLOTS WITH COMPUTER NUMERICAL CONTROLLED MACHINING CENTERS

(71) Applicant: Ford Global Technologies, LLC, Dearborn, MI (US)

(72) Inventors: David Alan Stephenson, Detroit, MI (US); Ethan Timothy Hughey, Royal Oak, MI (US); Bryce Andrew Schwager, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/584,476

(22) Filed: Sep. 26, 2019

(65) Prior Publication Data

US 2021/0094108 A1  Apr. 1, 2021

(51) Int. Cl.
*B23D 37/00* (2006.01)
*B23D 37/06* (2006.01)
*B23D 43/02* (2006.01)
*B23D 41/02* (2006.01)
*B23D 37/22* (2006.01)

(52) U.S. Cl.
CPC .......... *B23D 37/005* (2013.01); *B23D 37/06* (2013.01); *B23D 41/02* (2013.01); *B23D 43/02* (2013.01); *B23D 37/22* (2013.01)

(58) Field of Classification Search
CPC ...... B23D 37/005; B23D 37/02; B23D 37/04; B23D 37/22; B23D 41/02; B23D 43/02; B23D 37/10; B23D 11/00; B23D 1/08; B23D 1/24; B23D 1/26
See application file for complete search history.

(56) References Cited

U.S. PATENT DOCUMENTS

| 1,724,669 A | 8/1929 | Lapointe |
| 5,328,309 A * | 7/1994 | Bishop ............... B23D 5/00 |
| | | 409/307 |
| 2010/0189526 A1 * | 7/2010 | Martin ............ B23D 37/06 |
| | | 409/244 |

FOREIGN PATENT DOCUMENTS

| CN | 104942378 | 6/2017 |
| CN | 107671344 | 2/2018 |
| EP | 0891833 A2 * | 1/1999 ............... B23D 1/26 |

OTHER PUBLICATIONS

English translation of EP 0891833 A2 (Year: 1999).*
(Continued)

*Primary Examiner* — Alan Snyder
(74) *Attorney, Agent, or Firm* — Burris Law, PLLC

(57) ABSTRACT

A method for shaping a blind slot in a workpiece includes using a standard computer numerical controlled machine center to radially step a single slot broaching tool into a precursor slot in the workpiece for a predetermined distance to form a slot with a blind end. After the slot with the blind end is formed, the method includes rotating at least one of the workpiece and the single slot broaching tool and radially stepping the single slot broaching tool into another precursor slot for another predetermined distance to form another slot with another blind end in the workpiece. The another predetermined distance is the same as the predetermined distance, or in the alternative, the another predetermined distance is different than the predetermined distance.

20 Claims, 6 Drawing Sheets

(56) References Cited

OTHER PUBLICATIONS

Gisstec, Keyway Broaching, Broaching Tools for Keyway, pp. 1-18, 2018, available at URL https://gisstec.com/broaching-tools/keyway-broaching.
Brighetti Meccanica, General Catalog 6th edition/rev.02, available at URL https://www.brighettibroaching.com.

* cited by examiner

METHODS OF SHAPING SLOTS WITH COMPUTER NUMERICAL CONTROLLED MACHINING CENTERS

FIELD

The present disclosure relates to shaping slots in a workpiece and particularly to shaping slots in a vehicle gearbox.

BACKGROUND

The statements in this section merely provide background information related to the present disclosure and may not constitute prior art.

Structural components (also referred to herein as "workpieces") for holding or housing parts such as electrical conductors, magnets, and gears, among others, use machined slots within the structural components to accurately locate and hold such parts in desired positions. In some structural components, the slots are blind slots, i.e., a distal end of the slot abuts against a wall such that the slot does not extend through the structural component. One non-limiting example of such a structural component is a vehicle gearbox with a plurality of blind slots to position and hold a planetary gearset.

Since blind slots have a "blind end", common machining methods such as broaching or peripheral (slab) milling cannot be used to form the slots thereby resulting in dedicated shaping tools or spindle attachments such as right angle heads to form the blind slots.

The present disclosure addresses the issues of forming blind slots among other issues related to manufacturing structural components with blind slots.

SUMMARY

This section provides a general summary of the disclosure and is not a comprehensive disclosure of its full scope or all of its features.

In one form of the present disclosure, a method for shaping a blind slot in a workpiece includes radially stepping a slot broaching tool into a precursor slot in the workpiece for a predetermined distance along a length of the precursor slot and forming a slot with a blind end. In at least one variation, the slot broaching tool is a single slot broaching tool and the method includes rotating at least one of the workpiece and the single slot broaching tool, and radially stepping the single slot broaching tool into another precursor slot for another predetermined distance along a length of the another precursor slot and forming another slot with another blind end. In some variations, the another predetermined distance is the same as the predetermined distance, while in other variations the another predetermined distance is different than the predetermined distance. In one variation, the precursor slot is at least partially in a sidewall of the workpiece and the workpiece is formed from aluminum or an aluminum alloy. In at least one variation, the workpiece is an aluminum or aluminum alloy casting. In one form of the present disclosure, the method includes radially stepping the single slot broaching tool into the precursor slot for the predetermined distance along the length of the precursor slot with a standard computer numerical controlled machining center. In some variations, a first single slot broaching tool is radially stepped into the precursor slot and forms an intermediate-shaped slot. In such variations, a second slot broaching tool (e.g., a side-cutting tool) is radially stepped into the intermediate-shaped slot in the workpiece to form a finished blind slot.

In another form of the present disclosure, a method for shaping blind slots in a workpiece includes aligning a single slot broaching tool along a first precursor slot in the workpiece and radially stepping the single slot broaching tool into the first precursor slot of the workpiece for a first predetermined distance along a length of the first precursor slot and forming a first blind slot. The method also includes rotating at least one of the workpiece and the single slot broaching tool such that the single slot broaching tool is aligned along a second precursor slot and radially stepping the single slot broaching tool into the second precursor slot for a second predetermined distance along a length of the second precursor slot and forming a second blind slot. In some variations, the method includes rotating at least one of the workpiece and the single slot broaching tool such that the single slot broaching tool is aligned along a third precursor slot and radially stepping the single slot broaching tool into the third precursor slot for a third predetermined distance along a length of the third precursor slot and forming a third blind slot. In at least one variation, the first, second and third blind slots are unevenly spaced from each other. In at least one other variation, the first, second and third predetermined distances are the same, or in the alternative, at least one of the first, second and third predetermined distances is not the same. In some variations, a first single slot broaching tool forms a first, second and third intermediate-shaped slot at the first, second and third precursor slot locations, respectively. In such variations, the method includes radially stepping a second single slot broaching tool into the first, second and third intermediate-shaped slots and forming first, second and third finished blind slots, respectively.

In still another form of the present disclosure, a method for shaping a plurality of blind slots in an aluminum alloy casting includes mounting the aluminum alloy casting in a standard computer numerical controlled (CNC) machining center and programming the standard CNC machining center to shape the plurality of blind slots in the aluminum alloy casting. The standard CNC machining center selects a single slot broaching tool from a tool magazine such that the single slot broaching tool is mounted to a spindle. The standard CNC machining center aligns the single slot broaching tool along a first slot location on the aluminum alloy casting. The single slot broaching tool is radially stepped into a section of the aluminum alloy casting at the first slot location for a first predetermined distance and a first predetermined depth to form a first blind slot in the aluminum alloy casting. The standard CMC machining center automatically rotates at least one of the aluminum alloy casting and the single slot broaching tool such that the single slot broaching tool is aligned along a second slot location on the aluminum alloy casting and radially steps the single slot broaching tool into the section of the workpiece at the second slot location for a second predetermined distance and a second predetermined depth to form a second blind slot in the aluminum alloy casting. In at least one variation of the present disclosure, the method includes the standard CNC machining center aligning the single slot broaching tool along a third slot location on the aluminum alloy casting and radially stepping the single slot broaching tool into the section of the aluminum alloy casting at the third slot location for a third predetermined distance and a third predetermined depth to form a third blind slot in the aluminum alloy casting. In some variations, the first, second, and third slot locations are first, second, and third precursor slot locations, respectively, and the single slot broaching tool is a first single slot broaching tool that enlarges the first, second, and third locations and forms first, second and third intermediate-shaped slots. In at least one variation, the method includes the standard CNC machining center selecting a second single slot broaching tool from the tool magazine such that the second single slot broaching tool is mounted to the spindle and radially stepping the second single slot broaching tool into the first, second, and third intermediate-shaped slots and forming first, second, and third finished blind slots in the aluminum alloy casting.

DRAWINGS

In order that the disclosure may be well understood, there will now be described various forms thereof, given by way of example, reference being made to the accompanying drawings, in which:

FIGS. 6A-6B illustrate a plurality of steps for forming a plurality of blind slots in the workpiece using a standard CNC machining center according to one form of the present disclosure with: FIG. 6A illustrating forming a first blind slot; and FIG. 6B illustrating forming a second blind slot;

Figure 7A:
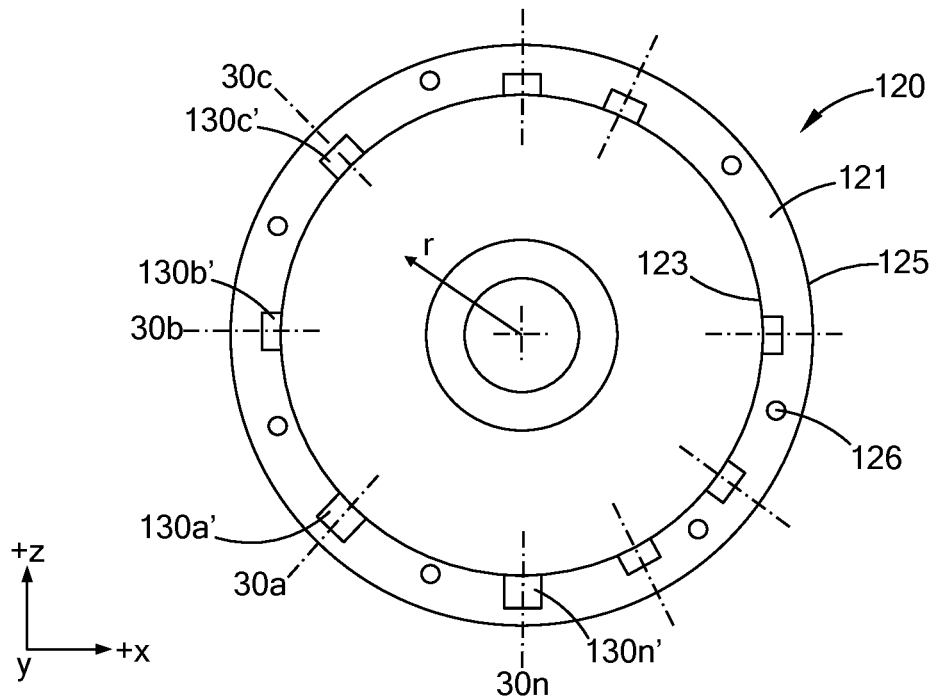
Figure 7B:
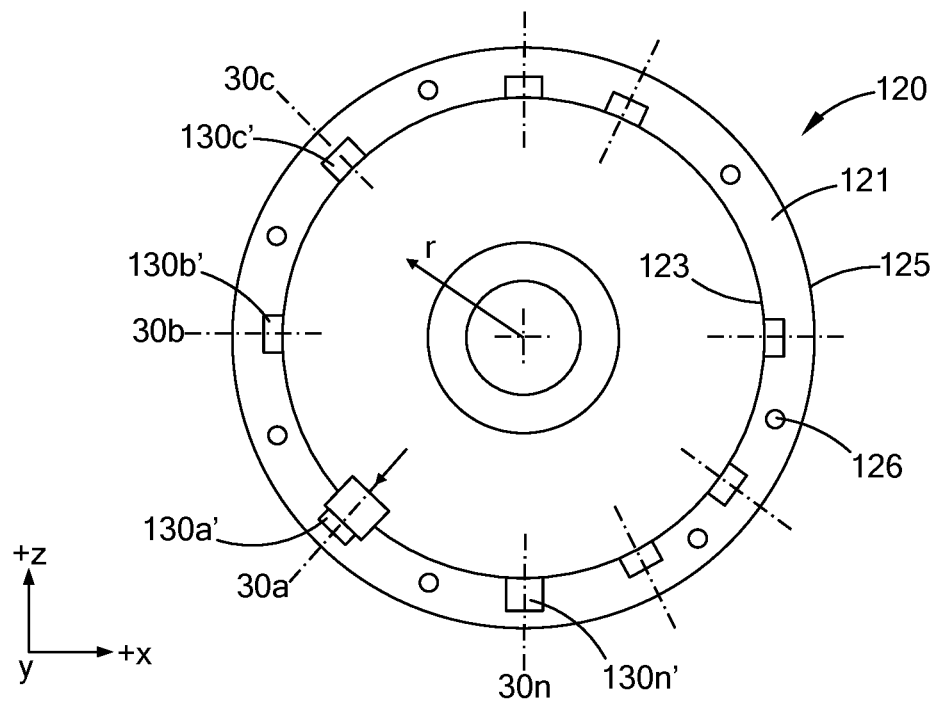
Figure 7C:
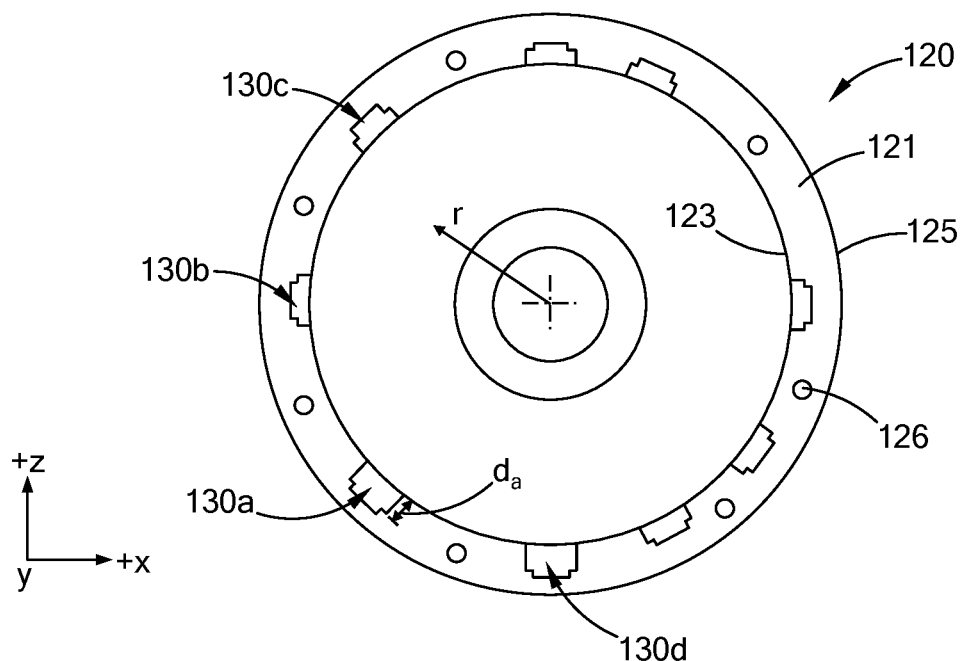
Figures 8A, 8B:
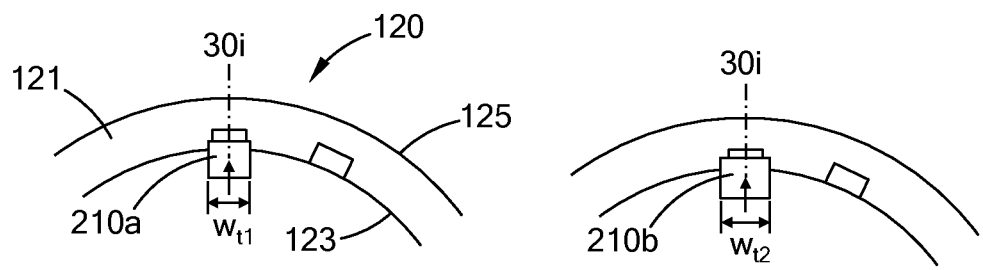

FIGS. 7A-7C illustrate a plurality of steps for forming a plurality of blind slots in a workpiece using a standard CNC machining center according to another form of the present disclosure with: FIG. 7A illustrating a transmission gear box with a plurality of pre-cursor slots; FIG. 7B illustrating forming a first finished blind slot; and FIG. 7C illustrating the workpiece with a plurality of finished blind slots; and FIGS. 8A-8B illustrate two steps for forming a blind slot in a workpiece using a standard CNC machining center according to another form of the present disclosure with: FIG. 8A illustrating forming an intermediate-shaped slot with a first single slot broaching tool; and FIG. 8B illustrating forming a finished blind slot with a second single sot broaching tool.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 1:
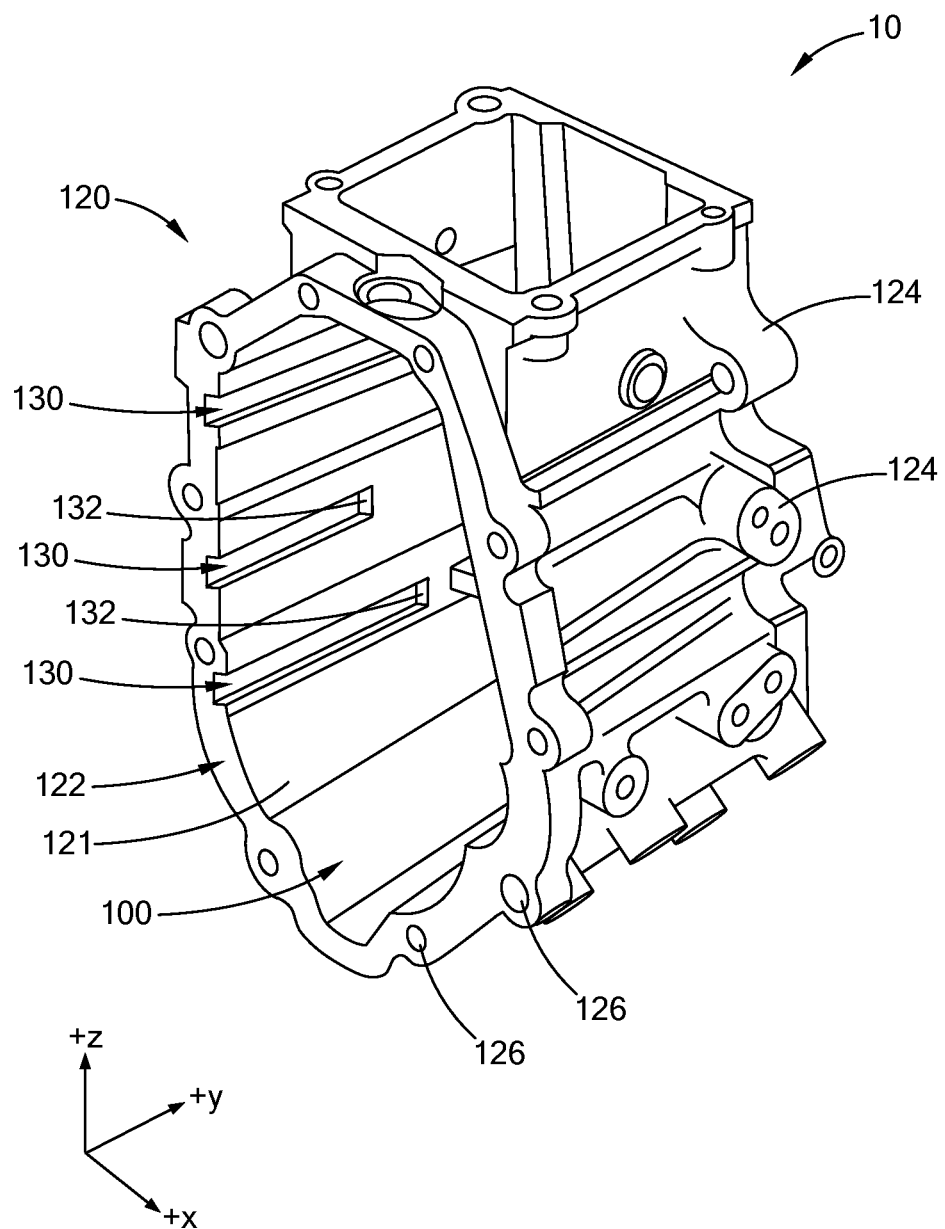
FIG. 1 is a perspective view of a workpiece with blind slots formed according to the teachings of the present disclosure.

Referring now to FIG. 1, a workpiece 10 in the form of a transmission gear box according to one form of the present disclosure includes a housing 120 defining an interior 100. The housing 120 includes a side wall 121, an end face 122, and a plurality of features 124 (e.g., flanges, protrusions, openings, among others) for mounting the workpiece 10 to another component (not shown) and/or mounting other components (not shown) to the workpiece 10. The end face 122 includes a plurality of apertures 126 and the side wall 121 includes a plurality of blind slots 130. Each the blind slots 130 has a distal end 132 (+y direction in the FIG. 1, also referred to herein as a "blind end 132") comprising a wall oriented generally normal to a length (y direction) of the bond slot 130.

Figure 2:
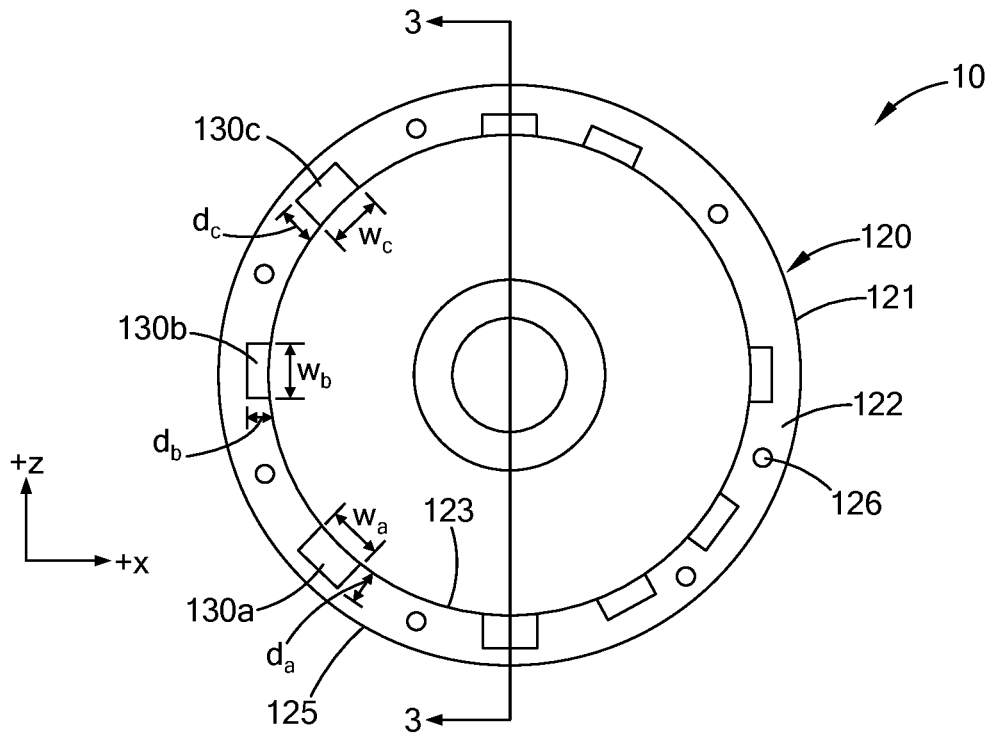
FIG. 2 is a simplified end view of the workpiece with blind slots formed according to the teachings of the present disclosure.
Figure 3:
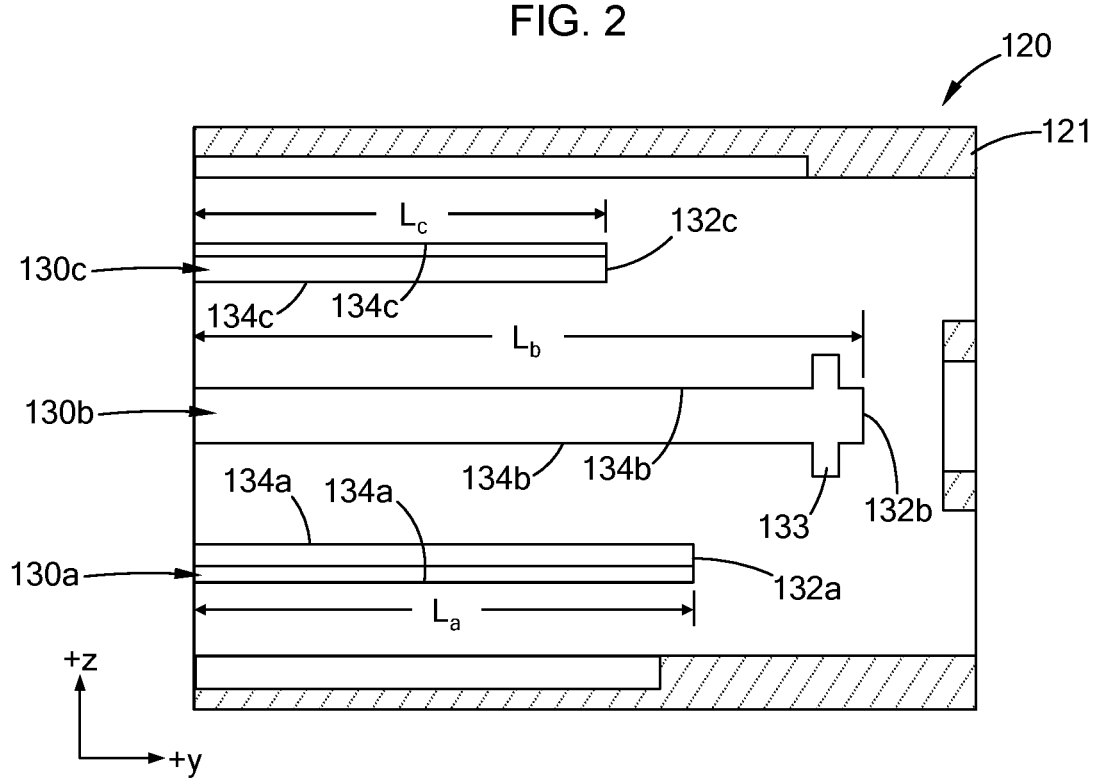
FIG. 3 is a cross sectional view of section 3-3 in FIG. 2.

Referring now to FIGS. 2 and 3, a simplified end view (circular) and cross sectional view, respectively, of the workpiece 10 is shown. Each of the blind slots 130 has a width 'w', a depth 'd', and a length 'L' as depicted in FIGS. 2 and 3. For example, a first blind slot 130a has a width '$w_a$' between a pair of side walls 134a, a depth '$d_a$' extending from an inner surface 123 of the side wall 120 towards an outer surface 125, and a length '$L_a$' extending from the end face 122 to the distal end 132a. Similarly, a second blind slot 130b has a width '$w_b$', a depth '$d_b$', and a length '$L_b$', and a third blind slot 130c has a width '$w_c$', a depth '$d_c$', and a length '$L_c$'. In some forms of the present disclosure, a channel 133 extending generally normal (z direction) to a bond slot 130 (e.g., second blind slot 130b) is included. In such forms, the channel 133 extends from the inner surface 123 towards the outer surface 125 of the side wall 120 and aids in forming of the blind slot 130 as discussed in greater detail below.

In one form of the present disclosure, at least two of the blind slot widths 'w' are generally equal (e.g., $w_a = w_b$), at least two of the blind slots depths 'd' are generally equal (e.g., $d_a = d_b$), and/or at least two of the band slot lengths 'L' are generally equal ($L_a = L_b$). In another form of the present disclosure, each of the bond slots have a different width 'w' (e.g., $w_a \neq w_b$, $w_a \neq w_c$, $w_b \neq w_c$), each of the blind slots have a different depth 'd' (e.g., $d_a \neq d_b$, $d_a \neq d_c$, $d_b \neq d_c$), and/or each of the blind slots have a different length (e.g., $L_a \neq L_b$, $L_a \neq L_c$, $L_b \neq L_c$).

Non-limiting examples of the range of blind slot widths 'w' include widths between about 5 millimeters (mm) and about 10 mm, between about 10 mm and about 15 mm, between about 15 mm and about 20 mm, and between about 20 mm and about 25 mm. Non-limiting examples of the range of blind slot depths 'd' include depths between about 2.5 mm and about 5 mm, between about 5 mm and about 7.5 mm, between about 7.5 mm and about 10 mm, and between about 10 mm and about 12.5 mm. Non-limiting examples of the range of blind slot lengths 'L' include lengths between about 25 mm and about 50 mm, between about 50 mm and about 75 mm, between about 75 mm and about 100 mm, and between about 100 mm and about 125 mm. It should be understood that the tolerances of the blind slots 130 (i.e., tolerances of the dimensions) are controlled to within about +/−0.25 mm for example within about +/−0.12 mm, or within about +/−0.06 mm. Accordingly, accurate or precise machining or shaping of the blind slots is desired.

Figure 4:
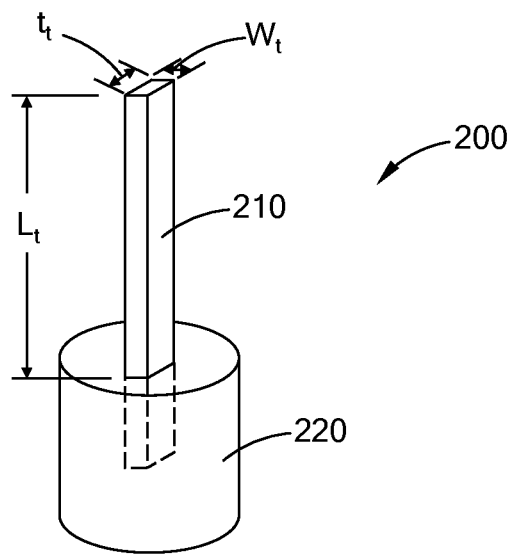
FIG. 4 is a perspective view of a single slot broaching tool for forming blind slots according to the teachings of the present disclosure.

Turning now to FIG. 4, a single slot broaching tool 200 is shown. The single slot broaching tool 200 includes a tool blade 210 and a tool holder 220. The tool blade 210 has a width '$w_t$', a thickness '$t_t$', and a length '$L_t$' extending from the tool holder 220. It should be understood that the tool blade 210 is securely and rigidly held by the tool holder 220 during radially stepping of the tool blade 210 into the housing 10, e.g., into the sidewall 121 of the housing 120. In at least one form of the present disclosure, the width $w_t$ is generally equal to a width of at least one of the bond slots 130 such that radially stepping the tool blade 210 into the housing 10 forms a finished blind slot 130 (also referred to herein simply as a "blind slot") using a single radially stepping operation of the tool blade 210 into the sidewall 121. In the alternative, the width $w_t$ of the tool blade 210 is less than the width of at least one finished blind slot 130 such that stepping the tool blade 210 into the housing 10 forms an intermediate-shaped slot as described in greater detail below. It should be understood that the tool blade 210 includes a cutting edge (not labeled) that removes material from the housing 10 as the tool blade 210 is radially stepped into the housing 10 for a predetermined distance along the length (y direction) of the housing 10 such that at least one of the blind slots 130 is formed.

Figure 5:
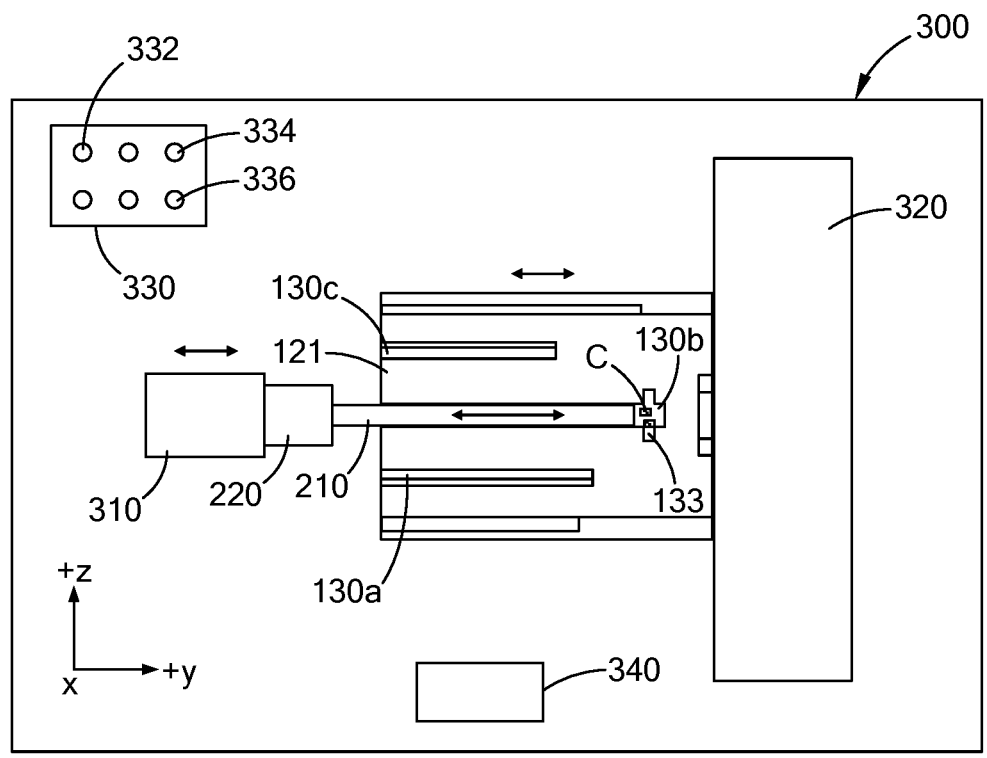
FIG. 5 is a side view of a blind slot being formed in the workpiece in FIG. 3 using a standard computer numerical controlled (CNC) machining center according to the teachings of the present disclosure.

Referring now to FIG. 5, forming of a plurality of blind slots 130 using the single slot broaching tool 210 and a standard computer numerical controlled (CNC) machining center 300 is shown. As used herein, the phrase "standard computer numerical controlled machining center" refers to an automated 4-axis or 5-axis horizontal milling and drilling machining center or to an automated 4-axis or 5-axis mill-turn machining center. The standard CNC machining center 300 includes a spindle 310 configured to hold the tool holder 220 and a base plate 320 configured to hold the workpiece 10. A tool magazine 330 with a plurality of tools 332, 334, 336 is included, as is a controller 340. The controller 340 is programmed to execute a plurality of machining steps such that the spindle 310 radially steps the tool blade 210 of the single slot broaching tool 200 into the sidewall 121 to form at least one of the blind slots 130. For example, and as shown in FIG. 5, the tool blade 210 is displaced radially (−x direction) relative to the sidewall 121 and moves along a length direction (+y direction) of the blind slot 130b for a predetermined distance such that the tool blade 210 removes material (e.g., chips of material) from the sidewall 121. The tool blade 210 then moves back along the length direction (−y direction) to the end face 122 to begin another cut of the material via radially displacement (x direction) of the tool blade further into the sidewall 121 and movement along the length direction of the bond slot 130b (for the predetermined distance). The combination of the radially stepping of the tool blade 210 into the sidewall 121 and movement of the tool blade 210 along the length direction of the blind slot 130b continues until a desired depth 'd' of the slot is formed, in at least one variation, the channel 133 is included in the sidewall 121 before the slot 130b is formed such that chips 'C' of the material can be removed from the blind slot 130b during the slot forming process.

After blind slot 130b is formed, the single slot broaching tool 200 and/or the workpiece 10 is rotated such that the tool blade 210 is aligned co-linearly (y direction) with another slot location, e.g., the location for blind slot 130c. In some variations of the present disclosure, the standard CNC machining center 300 uses the same single slot broaching tool 200 to form the next blind slot, while in other variations the standard CNC machining center 300 uses a different single slot broaching tool (e.g., selected from the tool magazine 330) to form the next blind slot. In addition, in some variations the standard CNC machining center 300 uses different tools (e.g., tools 332, 334, and 336, among others) to perform other machining operations such as drilling and tapping, among others, before, during and/or after forming the plurality of blind slots 130 in the workpiece 10.

Figure 6A:
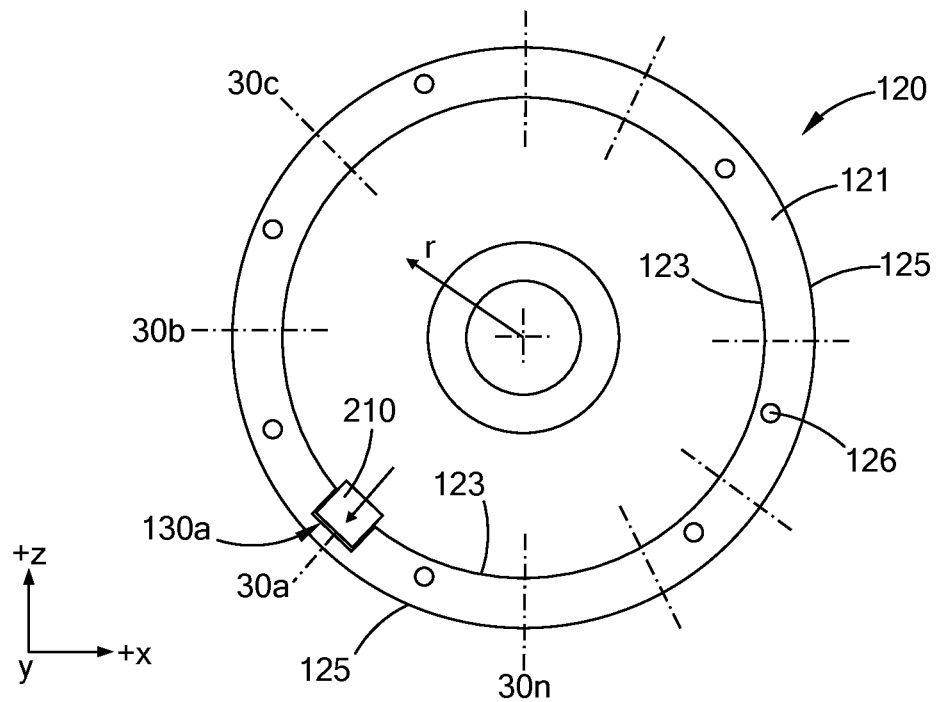
Figure 6B:
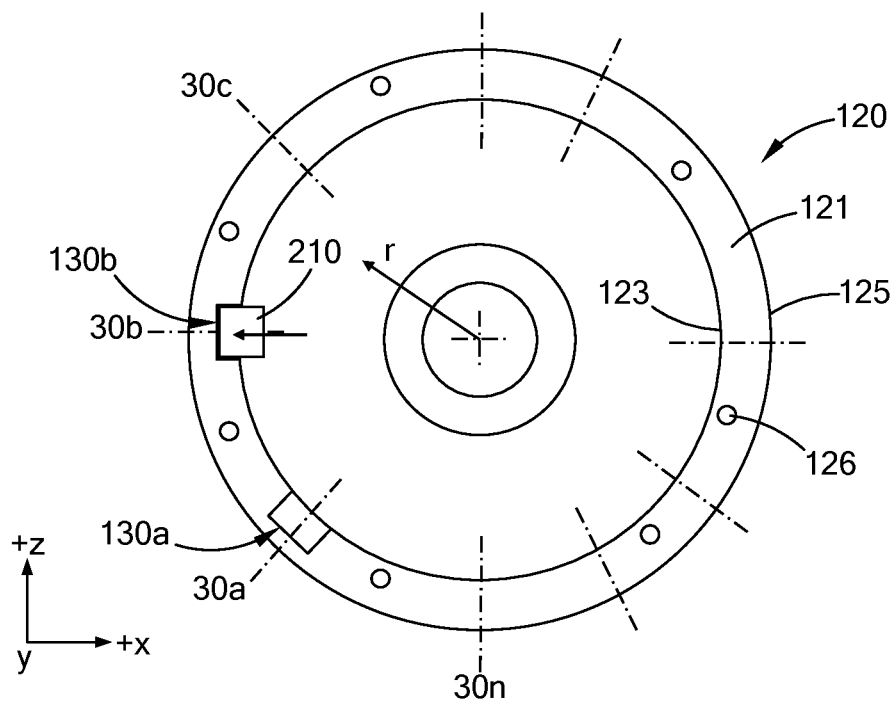

Referring now to FIGS. 6A and 6B, an end view (+y direction) of the workpiece 10 during forming of blind slots according to one form of the present disclosure is shown. Particularly, and with reference to FIG. 6A, a plurality of slots locations 30a, 30b, . . . 30n are defined along the sidewall 121 of the housing 120 and the tool blade 210 is aligned with a first slot location 30a. The tool blade 210 is radially stepped (+r direction in FIG. 6A) a predetermined depth into the sidewall 121 of the housing 120 and moved a predetermined distance (+y direction) along the sidewall 121 to remove material from the first slot location 30a. The tool blade 210 then returns (−y direction) to the end face 122, is radially stepped (+r direction) further into the sidewall 121 and moved the predetermined distance (+y direction) along the sidewall 121 to remove additional material from the first slot location 30a. It should be understood that this process or cycle continues until a desired amount of material has been removed from the sidewall 121 such that a first blind slot 130a with a desired depth is formed.

After the first blind slot 130a is formed, at least one of the workpiece 10 and the single slot broaching tool 200 is rotated such that the tool blade 210 is aligned with a second slot location 30b (FIG. 6B). That is, the workpiece 10 and the single slot broaching tool 200 are moved relative to each other such that the tool blade 210 is circumferentially aligned with the second slot location 30b. The tool blade 210 is radially stepped (+r direction) a predetermined depth into the sidewall 121 of the housing 120 and moved a predetermined distance (+y direction) along the sidewall 121 to remove material from the second slot location 30b (FIG. 6B). The tool blade 210 then returns (−y direction) to the end face 122, is radially stepped (+r direction) further into the sidewall 121 and moved the predetermined distance (+y direction) along the sidewall 121 to remove additional material from the first slot location 30b. It should be understood that this process or cycle continues until a desired amount of material has been removed from the sidewall 121 such that a second blind slot 130b with a desired depth is formed. It should also be understood that the process continues until all of the blind slots 130 are formed in the sidewall 121 (FIG. 2).

Referring now to FIGS. 7A-7C, an end view (+y direction) of the workpiece 10 during forming of blind slots according to another form of the present disclosure is shown. Particularly, and with reference to FIG. 7A, a plurality of slots locations 30a, 30b, . . . 30n in the form of precursor slots 130a' . . . 130n' are defined along the sidewall 121 of the housing 120. In at least one variation, the precursor slots 130a' . . . 130n' are cast precursor slots within the sidewall 121 of an aluminum or aluminum alloy cast workpiece 10. That is, the precursor slots 130a' . . . 130n' are formed in the sidewall 121 during casting (e.g., die casting) of the workpiece 10. The tool blade 210 is aligned with a first slot location 30a, i.e., the first precursor slot 130a' (FIG. 7B), and radially stepped (+r direction) a predetermined depth into the sidewall 121 of the housing 120 and moved a predetermined distance (+y direction) along the sidewall 121 to remove material from the first slot location 30a. The tool blade 210 then returns (−y direction) to the end face 122, is radially stepped (+r direction) further into the sidewall 121 and moved the predetermined distance (+y direction) along the sidewall 121 to remove additional material from the first slot location 30a. It should be understood that this process or cycle continues until a desired amount of material has been removed from the sidewall 121 such that the first blind slot 130a with a desired depth '$d_a$' (FIG. 7c) is formed. It should also be understood that the first blind slot 130a, and other blind lots 130 formed in the workpiece 10, may be formed without the tool blade 210 reaching the depth (+r direction) of the precursor slot 130a' as shown in FIG. 7C. That is, the first blind slot 130a has a depth $d_a$ that is less than a depth of the precursor slot 130a'.

After the first slot 130a is formed, at least one of the workpiece 10 and the single slot broaching tool 200 is rotated such that the tool blade 210 is aligned with a second slot location 30b, i.e., the second precursor slot 130b'. That is, the workpiece 10 and the single slot broaching tool 200 are moved relative to each other such that the tool blade 210 is aligned circumferentially with the second slot location 30b and co-linearly with the second precursor slot 130b'. The tool blade 210 is radially stepped (+r direction) a predetermined depth into the sidewall 121 of the housing 120 and moved a predetermined distance (+y direction) along the sidewall 121 to remove material from the second slot location 30b. The tool blade 210 then returns (−y direction) to the end face 122, is radially stepped (+r direction) further into the sidewall 121 and moved the predetermined distance (+y direction) along the sidewall 121 to remove additional material from the second slot location 30b. It should be understood that this process or cycle continues until a desired amount of material has been removed from the sidewall 121 such that the second blind slot 130b with a desired depth is formed. It should also be understood that the process continues until all of the blind slots 130a . . . 130n are formed in the sidewall 121 as shown in FIG. 7C.

While FIGS. 7A-7C show the blind slots 130a . . . 130n being formed using only one single slot broaching tool 200 for each blind slot, in at least one form of the present disclosure, one or more blind slots are formed using more than one slot broaching tool. For example, and with reference to FIGS. 8A and 8B, a first tool blade 210a is used to remove a first width '$w_{t1}$' of material from a slot location 30i and a second tool blade 210b is used to remove a second width $w_{t2}$, greater than the first width $w_{t1}$, of material from the slot location 30i, and form a finished blind slot (not shown) with a width $w_{t2}$. It should be understood that using the first tool blade 210a with the first width $w_{t1}$ and the second tool blade 210b with the second width $w_{t2}$ greater than the first width $w_{t1}$, reduces the amount of torque between the workpiece 10 and the second tool blade 210b during forming of the finished blind slot, thereby improving a surface finish of the finished blind slot.

It should be understood from the teachings of the present disclosure that a method for forming blind slots in a workpiece is provided. The method uses a single slot broaching tool and a standard CNC machining center. The standard CNC machining center radially steps the slot broaching tool into a sidewall of the workpiece to form a blind slot in the workpiece. In at least one variation of the present disclosure, the standard CNC machining center radially steps the slot broaching tool into a precursor slot in a sidewall of a workpiece for a predetermined distance to form a finished blind slot in the workpiece. The method allows for pre-existing standard CNC machining centers used to perform other machining operations on the workpiece including drilling, milling, tapping, among others, to be used to form the blind slots. Accordingly, specialized slot forming machines, radial slot forming tools, and the like, are not needed to form blind slots in a workpiece, thereby reducing the costs of manufacturing workpieces with blind slots.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Specially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for shaping a blind slot in a workpiece comprising:
   providing the workpiece, the workpiece being a casting including a precursor slot that is cast into the workpiece;
   radially stepping a slot broaching tool into the precursor slot in the workpiece; and
   moving the slot broaching tool in a linear direction for a predetermined distance along a length of the precursor slot and forming a slot with a blind end.

2. The method according to claim 1, wherein the slot broaching tool is a single slot broaching tool, and the method further comprising:
   rotating at least one of the workpiece and the single slot broaching tool;
   radially stepping the single slot broaching tool into another precursor slot; and
   moving the single slot broaching tool in the linear direction for another predetermined distance along a length of the another precursor slot and forming another slot with another blind end.

3. The method according to claim 2, wherein the another predetermined distance is the same as the predetermined distance.

4. The method according to claim 2, wherein the another predetermined distance is different than the predetermined distance.

5. The method according to claim 1, wherein the precursor slot is at least partially in a sidewall of the workpiece.

6. The method according to claim 1, wherein the workpiece is formed from aluminum or an aluminum alloy.

7. The method according to claim 1, wherein the workpiece is an aluminum or aluminum alloy casting.

8. The method according to claim 1 further comprising radially stepping the single slot broaching tool into the precursor slot and moving the slot broaching tool in the linear direction for the predetermined distance along the length of the precursor slot with a standard computer numerical controlled machining center.

9. The method according to claim 1, wherein the single slot broaching tool is a first single slot broaching tool that forms an intermediate-shaped slot.

10. The method according to claim 9 further comprising radially stepping a second slot broaching tool into the intermediate-shaped slot and moving the second slot broaching tool in the linear direction for the predetermined distance along the length of the precursor slot and forming a finished blind slot.

11. The method according to claim 10, wherein the first single slot broaching tool forms the intermediate-shaped slot to have a first width and the second slot broaching tool forms the finished blind slot to have a second width that is greater than the first width.

12. The method according to claim 1, wherein the precursor slot has a first depth and a finished depth of the slot formed by moving the slot broaching tool is less than the first depth.

13. A method for shaping blind slots in a workpiece comprising:
   providing the workpiece, the workpiece being a casting including a first precursor slot that is cast into the workpiece and a second precursor slot that is cast into the workpiece;
   aligning a single slot broaching tool along the first precursor slot of the workpiece;
   radially stepping the single slot broaching tool into the first precursor slot;
   moving the single slot broaching tool in a linear direction for a first predetermined distance along a length of the first precursor slot and forming a first blind slot;
   rotating at least one of the workpiece and the single slot broaching tool such that the single slot broaching tool is aligned along the second precursor slot of the workpiece;
   radially stepping the single slot broaching tool into the second precursor slot; and
   moving the single slot broaching tool in the linear direction for a second predetermined distance along a length of the second precursor slot and forming a second blind slot.

14. The method according to claim 13 further comprising:
   rotating at least one of the workpiece and the single slot broaching tool such that the single slot broaching tool is aligned along a third precursor slot of the workpiece, the third precursor slot being a slot that is cast into the workpiece;
   radially stepping the single slot broaching tool into the third precursor slot; and
   moving the single slot broaching tool in the linear direction for a third predetermined distance along a length of the third precursor slot and forming a third blind slot.

15. The method according to claim 14, wherein the first, second and third blind slots are unevenly spaced from each other.

16. The method according to claim 14, wherein the first predetermined distance, the second predetermined distance, and the third predetermined distance are the same.

17. The method according to claim 14, wherein at least one of the first predetermined distance, the second predetermined distance, and the third predetermined distance is not the same as the other at least one of the first predetermined distance, the second predetermined distance, and the third predetermined distance.

18. The method according to claim 14, wherein the single slot broaching tool forms a first intermediate-shaped slot, a second intermediate-shaped slot, and a third intermediate-shaped slot at the first precursor slots, the second precursor slot, and the third precursor slot, respectively.

19. The method according to claim 18 further comprising radially stepping a side-cutting tool into the first intermediate-shaped slot, the second intermediate-shaped slot, and the third intermediate-shaped slot and forming a first final-shaped blind slot, a second final-shaped blind slot, and a third final-shaped blind slot, respectively.

20. The method according to claim 19, wherein the first precursor slot has a first depth that is greater than a depth of the first final-shaped blind slot formed by the side-cutting tool, wherein the second precursor slot has a second depth that is greater than a depth of the second final-shaped blind slot formed by the side-cutting tool, wherein the third precursor slot has a third depth that is greater than a depth of the third final-shaped blind slot formed by the side-cutting tool.

* * * * *